Dec. 15, 1959   M. L. BARDASH ET AL   2,917,710
PUNCH THROUGH TESTER
Filed Oct. 23, 1957

INVENTORS.
MANUEL L. BARDASH
DAVID P. SARETT

BY Raymond A. Paquin

ATTORNEY.

United States Patent Office 2,917,710
Patented Dec. 15, 1959

2,917,710

PUNCH THROUGH TESTER

Manuel L. Bardash, Bayside, and David P. Sarett, Massapequa, N.Y., assignors to American Bosch Arma Corporation, a corporation of New York Application October 23, 1957, Serial No. 691,920

4 Claims. (Cl. 324—158)

The present invention relates to transistor test circuits and has particular reference to means for automatically determining the punch through voltage of transistors.

A particular type of breakdown which occurs in transistors is known as punch through. This occurs when the depletion region of the collector barrier moves through the base region to make contact with the emitter. Thus, in an open emitter transistor the emitter voltage becomes substantially equal to the collector voltage at punch through. There is no permanent damage done to a transistor which has undergone punch through as long as the current is limited, and for this reason the transistor may be subjected to punch through during the test without impairing its future utility.

For purposes of the present invention the punch through voltage is defined as that collector voltage which will produce in an open transistor an emitter voltage having a predetermined value, such as one volt, for example.

In the preferred embodiment the output of an integrator is applied between the collector and base of an open emitter, common base transistor. The input to the integrator is proportional to the difference between the emitter voltage and the predetermined voltage. When the integrator input becomes zero, the emitter voltage is equal to the predetermined voltage and the collector voltage is equal to the punch through voltage. At this time the circuit is stabilized and the punch through voltage can be read on a voltmeter connected between the collector and the base.

For a more complete understanding of the invention, reference may be had to the accompanying diagrams, in which Fig. 1 shows a particular preferred embodiment of the invention;

Figure 1:
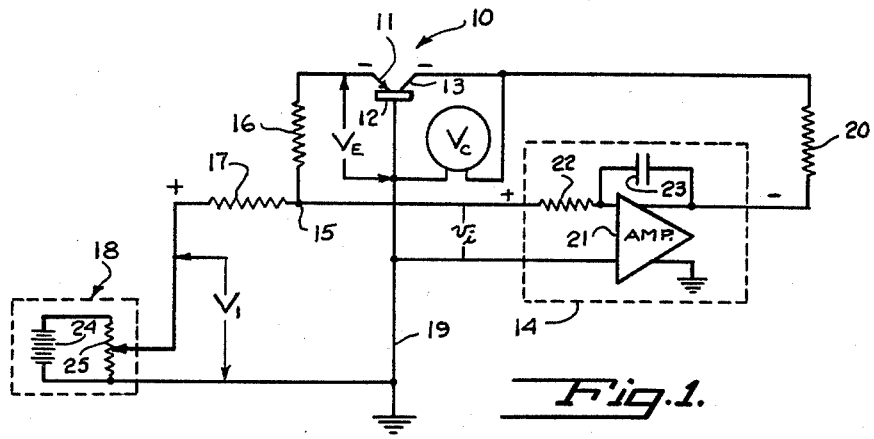

Referring now to the preferred embodiment shown in Fig. 1 of the drawings, the circuit includes a test transistor 10 having emitter 11, base 12 and collector 13 electrodes. The collector 13 is electrically connected to the output of the integrator 14 through a current limiting resistor 20, the input of which is connected to the junction 15 of the two equal resistors 16 and 17. The opposite end of resistor 16 is electrically connected to the emitter electrode 11 and the other end of resistor 17 is connected to a D.C. voltage source 18 of predetermined value. The base 12 of the transistor 10 is connected to lead 19 which is common to the low potential side of each of the voltage source 18 and the integrator 14.

Figure 2:
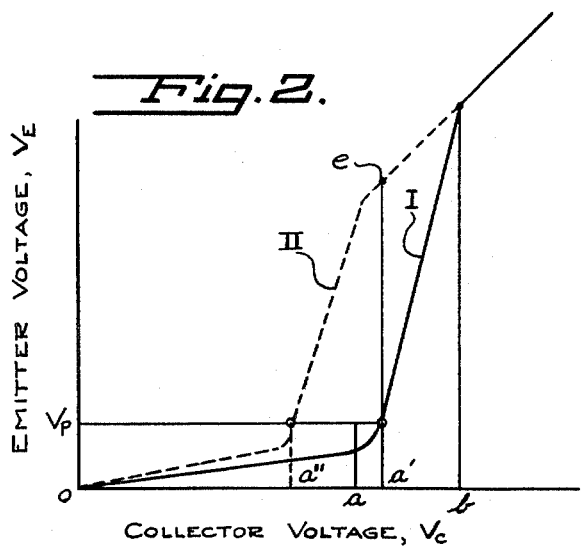
Fig. 2 is a graph defining certain values used in the description.

Fig. 2 shows a typical curve I of emitter voltage $V_e$ plotted against the collector voltage $V_c$ of an open transistor. It will be seen that for low values of collector voltage the emitter voltage increases linearly therewith but is of small magnitude. In the region $V_c = a$ to $V_c = b$, $V_e$ rises very sharply with $V_c$ up to a value where $V_e$ is equal to $V_c$. For $V_c$ greater than $b$, $V_e$ remains equal to $V_c$. Punch through occurs somewhere in the region $V_c = a$ to $V_c = b$ and for the purposes of this invention punch through will be considered as occurring when $V_e = V_p$ where $V_p$ is arbitrarily chosen so as to make the intersection of the line $V_e = V_p$ with the curve I lie in the region of the sharp rise of $V_e$, preferably at the lower knee where $V_c = a'$.

Returning now to Fig. 1, it will be seen that if the voltage between the emitter electrode 11 and the common lead 19 is $V_e$ and the voltage across source 18 is $V_1$ then the voltage $v_i$ between junction 15 and lead 19 (which is the input to the integrator 14) is proportional to the sum of $V_1 + V_e$ or $v_i = k(V_1 + V_e)$. Thus, in order for $v_i$ to be equal to zero, $V_e$ must be equal to $-V_1$ and from Fig. 2, the value of $-V_1$ is chosen to be equal to $V_p$. $V_1$ is chosen positive for PNP transistors and negative for NPN transistors. Assuming the integrator output to be initially zero, $V_c$ is zero and consequently $V_e$ is zero. If resistors 16 and 17 are large compared to the value of the emitter and base resistances of transistor 10, the initial value of voltage $v_i$ is approximately equal to ½ $V_1$. The ½ $V_1$ input to the integrator 14 causes the output voltage to increase with time (with a polarity opposite to the input voltage) and the resulting $V_c$ causes the emitter voltage $V_e$ to increase with $V_c$ in accordance with Fig. 2 (with the same polarity as $V_c$).

After a certain time $V_c$ will become equal to $a'$ and at this time $V_e$ will become equal to $V_1$ in magnitude and opposite in phase so that $v_i$ is reduced to zero. Here the integration ceases and the integrator output will remain constant at a value defined as the punch through voltage, so that the punch through voltage may be read on a voltmeter connected between the collector electrode 13 and the common lead 19. The current limiting resistor 20 is provided to prevent the collector current from increasing to a value which may damage the transistor.

It may be found that upon substitution of another transistor, after punch through voltage of one transistor has been obtained, the existing output of the integrator 14 is greater than the punch through voltage of the substitute transistor whence $V_e$ is greater than $-V_1$. In this case, the input to the integrator 14 will be negative in sense and its output will decrease until $V_c$ has reached the defined punch through voltage where $V_e$ is equal to $-V_1$ and $v_i$ has again been reduced to zero. This situation is illustrated by curve II of Fig. 2. After the test on the transistor with characteristic curve I, another transistor with a characteristic curve II is inserted. The voltage $a'$ appearing at the collector was the punch through voltage of the first transistor, and with this voltage at the collector the voltage at the emitter is $e$. The input to the integrator being $V_1 + e$ is a negative value (since $e$ is of opposite sense to $V_1$ and is larger than $V_1$) and the output of the integrator will decrease from $a'$ toward $a''$. When the collector voltage reaches $a''$, the emitter voltage is equal to $-V_1$ so that the integrator input will be zero and the output of the integrator is stabilized at the punch through voltage of the second transistor.

For illustrative purposes the integrator 14 may comprise the well known operational amplifier of the type shown in the rectangle 14 of Fig. 1 although it is not limited thereto. The operational amplifier includes a D.C. amplifier 21 having a series resistor 22 in the input side and a feedback capacitor 23. Resistor 22 may be eliminated in the actual physical embodiment, since the resistors 16 and 17 can perform the function of the resistor 22.

The voltage source 18 preferably includes a battery 24 and a potentiometer 25 as shown in the rectangle 18 of Fig. 1, although this choice is not limiting. The potentiometer 25 is provided in order to ease selection of the desired value of $V_1$ for various types of transistors.

Also, it should be recognized that other means may be employed for obtaining the signal proportional to the error between $V_1$ and $V_e$ which is used for the integrator input. For example, the emitter voltage may be matched against the constant voltage $V_1$ by well known means as shown in Fig. 3 of the drawings.

The output of the integrator 14 is again connected between the collector 13 and base 12 electrodes while the emitter 11 and base 12 are connected to the input of an isolating network 30, such as an amplifier for example, which may be required to maintain the external impedance between the emitter and base electrodes at a high value. The output of the network 30 is compared with a constant voltage from the power supply 31 and the difference voltage is applied to the input of integrator 14. The operation of this circuit is exactly the same as that in Fig. 1, viz: if the emitter voltage is not equal to that by which punch through is defined ($V_p$) then the integrator 14 varies the collector voltage accordingly until $V_e=V_p$ and the integration ceases.

Figure 3:
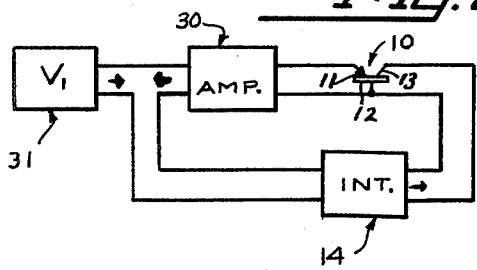
Fig. 3 is a modification of Fig. 1.

In the system shown in Fig. 3, only the voltages at the collector 13 and emitter 11 of transistor 10 must be direct voltages. Although D.C. may be used throughout, as in Fig. 1, the voltages in the voltage comparing loop are not limited to direct voltages since modulators, demodulators and other apparatus can be used for voltage conversion where necessary. For example, the direct voltage at the emitter 11 may be modulated and amplified in the amplifier 30, compared with an alternating voltage from supply 31, and the error signal integrated in a servo driven integrator which produces a direct current output. The example above is merely one of a multitude of possible embodiments wherein an alternating voltage may be used as the output of the voltage source 31.

We claim:

1. In a device of the character described, a signal source, an integrator, means for applying the output of said integrator between the collector and base of a transistor under test, means for comparing the voltage across the emitter and base of the transistor under test with the signal voltage, means for applying the difference or error voltage to the input of the integrator and means for indicating the voltage between the collector and base.

2. In a device of the character described, a source of predetermined voltage, an integrator, means for applying the output of said integrator between the collector and base of a transistor under test, means for comparing the voltage across the emitter and base of the transistor under test with the predetermined voltage, means for applying the difference or error voltage to the input of the integrator and means for indicating the voltage between the collector and base.

3. In a device of the character described, a signal source, an integrator, means for applying the output of said integrator between the collector and base of a transistor under test, means for comparing the voltage across the emitter and base of the transistor under test with the signal voltage, means for applying the difference or error voltage to the input of the integrator and means connected between said collector and base and responsive to the voltage between said collector and base.

4. In a device of the character described, a source of predetermined voltage, an integrator, means for applying the output of said integrator between the collector and base of a transistor under test, means for comparing the voltage across the emitter and base of the transistor under test with the predetermined voltage, means for applying the difference or error voltage to the input of the integrator and means connected between said collector and base and responsive to the voltage between said collector and base.

No references cited.